June 23, 1964    A. R. WELLS ETAL    3,138,698
CONTAINER AND ELECTRICAL HEATER MEANS
Filed Sept. 17, 1963    2 Sheets-Sheet 1
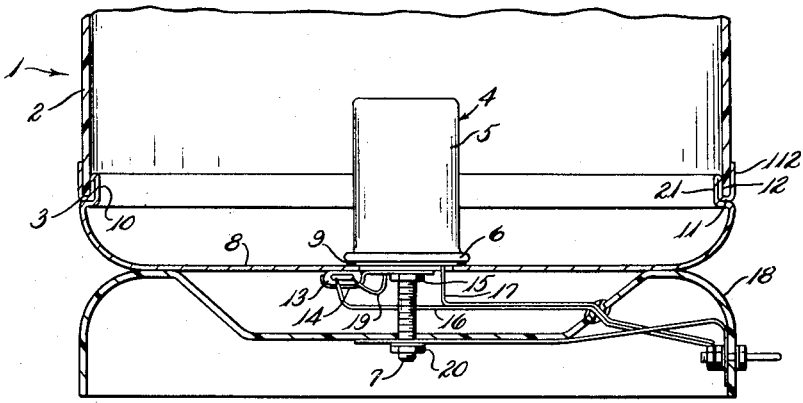
FIG. I
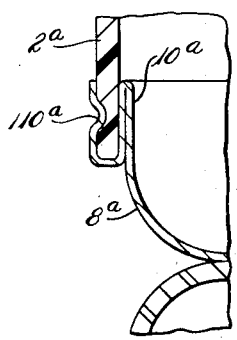
FIG. 2
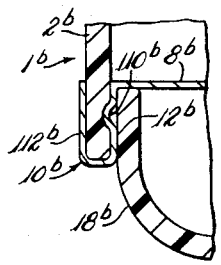
FIG. 3
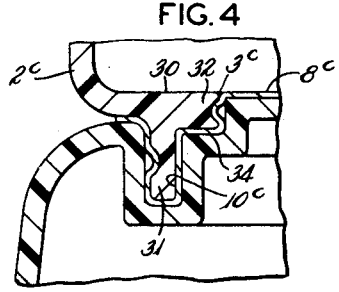
FIG. 4
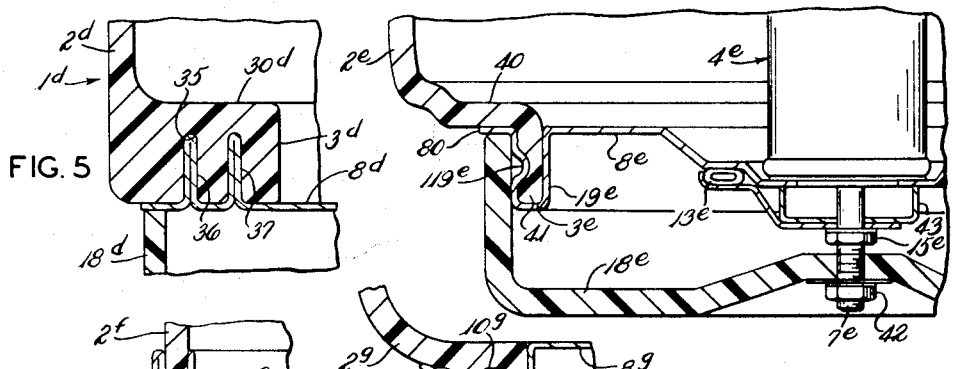
FIG. 5    FIG. 6
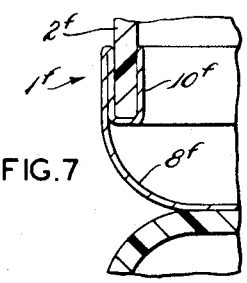
FIG. 7    FIG. 8
INVENTORS
ALTON R. WELLS
ROBERT M. WELLS
BY
ATTYS.

June 23, 1964  A. R. WELLS ETAL  3,138,698
CONTAINER AND ELECTRICAL HEATER MEANS
Filed Sept. 17, 1963  2 Sheets-Sheet 2

INVENTORS
ALTON R. WELLS
ROBERT M. WELLS
BY

ATTYS.

United States Patent Office 3,138,698
Patented June 23, 1964

3,138,698
CONTAINER AND ELECTRICAL HEATER MEANS
Alton R. Wells, 4573 W. Tradewinds Ave., Lauderdale-by-the-Sea, Fla., and Robert M. Wells, 4371 Ira Road, Akron 13, Ohio
Filed Sept. 17, 1963, Ser. No. 309,538
13 Claims. (Cl. 219—441)

The present invention relates to a novel container and electrical heater means therefor, and especially to a container that is adapted to be made from a suitable plastic material and which has an internal electrical resistance heater operatively associated therewith.

The present invention particularly relates to containers such as are used as percolators, for coffee brewing, or as water heaters or vaporizers, or for other liquid heating actions. Previous types of containers of this type have usually been made from metal, and have been relatively expensive. Obviously, it is quite important that the cost of these containers and control means therefor, if possible, be reduced, if a satisfactory type of an attractive, durable container and electric heater means therefor can be provided.

The present invention has as its general object the provision of a novel and improved container unit of the type described and characterized by the use of a metal positioning plate at a base portion of the plastic container body to complete the container and for positioning a heater unit therein, which plate is secured to the container body by an integral retaining flange, or groove means provided therein.

Another object of the invention is to provide a container of the class described where the container can be made from any suitable plastic material, either thermoplastic or thermosetting, and where a stainless steel heater positioning plate, or other metal plate having low heat conductivity is provided in the container.

Another object of the invention is to provide a heating means including a container providing its own heat source and with the body of the container being primarily made from a plastic material, the container being completed by a metal bottom plate secured to the plastic body by a liquid tight joint, and where a minimum number of parts are used in an attractive, inexpensive container.

Another object of the invention is to use an integral continuous double walled annular flange, groove, or rib of a metal support plate in a plastic container to secure the plate to a tongue adjacent a hole or opening in the bottom portion of the container body to close the opening in the container body by a tongue and groove connection and to use the metal support plate for securing heater means carried thereby in the bottom of the container unit.

A further object of the invention is to complete a plastic container body having an open lower end with a metal base or bottom plate that blends into the contour of the sides of the container body and is secured to the open lower end of the container body by an integral section of the base plate.

A further object of the invention is to provide a special combination between a metal base plate, an electric heater, a heater circuit control, a plastic container body, a base and means securing the various parts of the combination together, including the base, to form a sturdy unit, whereby a novel and attractive but durable container is provided, which container is relatively economical, and has desirable operating characteristics.

The foregoing and other objects and advantages of the invention will be made more apparent as the specification proceeds.

Attention now is particularly directed to the accompanying drawings, where:

FIG. 1 is a fragmentary vertical section, with the heater means shown in elevation, of a novel container, and electrical heater means assembly embodying the principles of the invention;

FIG. 2 is a fragmentary vertical section of a portion of a modified container unit of the invention;

FIG. 3 is a fragmentary vertical section of a portion of a further modification of the container shown in FIG. 1;

FIG. 4 is a fragmentary vertical section of a further modification of the container unit of the invention;

FIG. 5 is a fragmentary vertical section of a further modified container unit of the invention;

FIG. 6 is a fragmentary vertical section of a further modified embodiment of the invention showing a different base cup construction;

FIG. 7 is a fragmentary vertical section of a modification of the container unit of FIG. 1;

FIG. 8 is a fragmentary vertical section of a container having double sealing tongue and groove means therein;

Figure 9:
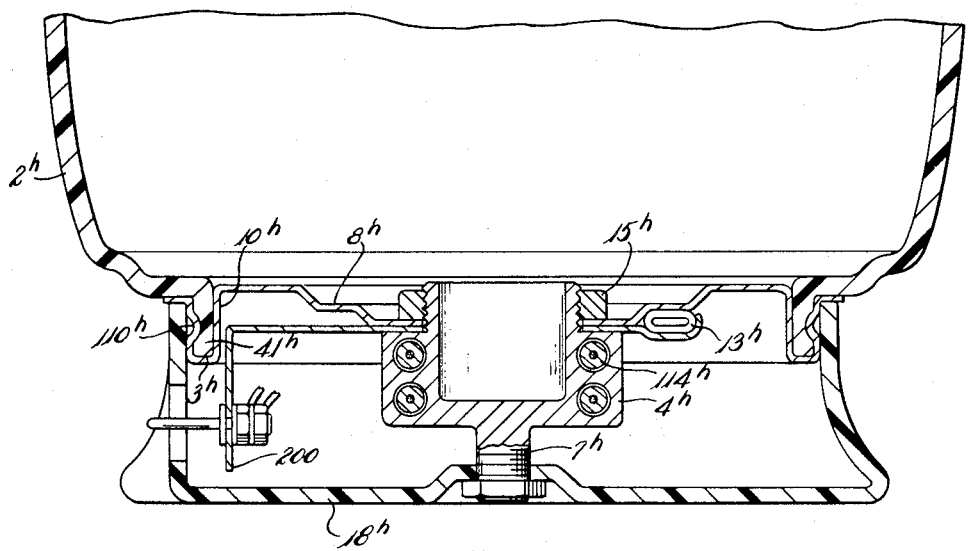
FIG. 9 is a fragmentary vertical section of a bottom portion of a novel container assembly of the invention.

Generally speaking, the present invention, as one important embodiment thereof, relates to the combination of a substantially rigid plastic container having a body or side wall terminating in a bottom aperture; an electrical heater unit; a metal plate of greater size than the bottom aperture having a continuous peripheral vertically extending channel section of generally U-shape in section formed therein, the heater unit being secured to a central portion of the metal plate in heat exchange relation therewith, the channel section being radially spaced from the heater unit by a continuous intermediate portion of the metal plate; the metal plate being secured to the plastic container, a portion of which plastic container is compressively secured between opposed walls of the channel section by a metal forming operation to seal the aperture in the container and position the heater unit within but spacially and thermally insulated from the plastic container by the continuous portion of the metal plate which is of an area correlated with the wattage of the heater unit, the size of the metal plate and the material from which it is made, and the composition of the plastic container so as to prevent the transfer of excessive heat to the plastic container thereby preventing damage to the plastic container by any use thereof, the metal plate being in contact with the liquid in the container; a thermostat positioned below and in at least substantially direct heat exchange relation to the metal plate to be primarily controlled by the temperature thereof; circuit means connecting to the thermostat and the heater unit and being connectable to a power supply; and base means for the plastic container operatively secured thereto.

The term "plastic" in the present application is used in its normal commercial sense to refer to a material which has some cold flow under pressure, which has some flexibility, and which is not brittle like glass. Hence the term "plastic" generally refers to synthetic or semi-synthetic organic substances made by polmerization or condensation, or which are derived from a natural material by chemical action and which can be molded, cast, extruded, drawn, or laminated under various conditions.

Attention now is particularly directed to the details of the structure shown in the accompanying drawings, and a container is indicated as a whole by the numeral 1 in FIG. 1 of the drawings. This container 1 can be made of any suitable size and shape, and it has a body, or side wall, 2 made from a suitable thermoplastic material, such as high density polyethylene, or polypropylene, or a thermosetting plastic material, such as melamine. The container body 2 has an aperture or opening 3 formed at its bottom. An electrical heater 4 of any suitable known construction is operatively positioned within the container 1 and such heater has a resistance coil provided therein. The heater 4 includes a metal enclosure, or can 5 which has a base flange or rib 6 formed at or adjacent to the base of this can 5 by suitable means. A stud 7 is suitably secured to the heater, or to the can 5 and extends axially downwardly therefrom.

In order to position the heater 4 within the container 1, but yet to thermally isolate and insulate such heater from the plastic material usually used to form the container body 2, a cup-shaped metal plane 8 is provided and such metal plate 8 preferably is made from a material having a low rate of heat conductivity, usually stainless steel. The can 5 of the heater 4 likewise can be made from the same metal as the plate 8 and in this instance, the base flange 6 of the can 5 is seam welded to the upper surface of the metal plate 8 by conventional welding techniques, as indicated at 9. However, the can 5 can be secured to the metal plate 8 in any known manner.

It is an important feature of the invention that this metal plate 8 is secured or sealed in engagement with the aperture 3 provided in the bottom of the container body 2, and to achieve this seal in the present invention, an integral, double walled continuous flange 10 is formed in the metal plate 8 adjacent the upper margin thereof. The metal plate 8 is contoured and sized to engage the container body 2 at the lower end thereof and to blend smoothly into the contour thereof. The flange 10 is of U-shape in section and includes a base portion 11 extending generally radially inwardly of the container body 2, and vertically extending radially inner and outer legs 12 and 112, respectively. The flange 10 in the form of the invention shown in FIG. 1 is connected to the remainder of the metal plate 8 by an annular generally L-shaped section 21 against which parts of the flange 12 may abut. The legs 12 and 112 may be suitably worked or rolled towards each other to form a liquid tight joint with the edge of the plastic container body. It is within the concept of the invention to reinforce the plastic container body 2 with suitable material, such as glass fibers, adjacent the margins of the aperture 3. Obviously, portions of the container body, or metal plate 8 can be reinforced while any rolling or other sealing force is applied to another portion thereof.

In order to complete the container 1 for use, a suitable electrical heat control member, such as a conventional thermostat 13, is operatively associated with the lower surface of the metal plate 8, and usually in good heat conductive engagement with both the metal plate and the can 5 of the heater 4. A metal clamp arm 14 is secured to the stud 7 and engages the thermostat 13 to position it in the specified manner. A nut 15 engages the stud 7 to secure the clamp arm and thermostat in operative association with the metal plate and heater can.

The electrical control circuit for the heater 4 is completed by means of power supply leads 16 and 17 that connect to conventional terminal prongs provided in a base 18 for the container 1. These leads connect to the thermostat 13 and to the heater, respectively, and a lead 19 extends from the thermostat to the heater to connect the thermostat and heater in a series circuit for control of the heating action in the container 1 by the thermostat 13. Obviously, the thermostat 13 is calibrated in such a manner as to prevent excessive heating of the container 1, or its contents.

The base 18 for the container body 2 is secured thereto, as by a lock nut 20 engaging the stud 7.

FIG. 2 of the drawings shows a modified container body 2a of the invention which has a metal support plate 8a provided therein, as in the other embodiment of the invention. However, in this instance, an outer flange 10a is provided in the metal plate and it is positioned radially outwardly of the cup shaped contour of the metal plate 8a. The U-shaped flange 10a is upwardly open and one leg thereof lies against an upper portion of the cup-shaped metal plate 8. Obviously compression action or forces may be applied to the upper, inner surfaces of the metal plate 8a to force the inner leg of the flange 10a outwardly into sealing engagement with the plastic container body 2a, and/or forces may be applied to the outer leg of the flange for a similar purpose.

A further modified container unit 1b is shown in FIG. 3 of the drawings and it has a modified base 18b that is of generally cup shape. A flat, or substantially flat, metal plate 8b has a U-shaped groove, or flange 10b formed therein by radially inner and outer legs or sections 12b and 112b. This flange 10b is at the periphery of the metal plate 8b, which insulates the plastic body 2b from the electric heat source secured to the metal plate.

In this container unit 1b of the invention, the lower end of the container 2b is snugly received within the groove provided by the legs or sections 12b and 112b. The lower end of the container body extends downwardly past the generally flat center portion of the metal plate 8b. It will be noted that the cup-shaped base 18b extends up and in this instance is directly supported upon a center portion of the metal plate 8b, and that the sections 12b and 112b extend downwardly from the general plane defined by the center portion of the metal plate.

A further modification of the container unit of the invention is shown in FIG. 4, and in this instance, a plastic container body 2c has an aperture 3c formed therein in a base portion 30 provided in the container body. The base portion 30 of the container 2c includes a downwardly extending continuous flange, or end wall 31 and it has a continuous radially inwardly extending rib 32 formed thereon usually at the upper end of the end wall 31. The drawing also clearly shows that a bottom plate 8c in this instance has a substantially U-shaped double walled flange, or groove 10c provided integral with the metal plate. The flange 10c includes two continuous substantially parallel, radially spaced, vertically extending walls adapted to snugly receive the end wall 31 of the container body therein. The metal base plate 8c also has an axially offset shoulder 34 formed therein and extending radially inwardly of the container unit for bearing and/or sealing engagement with the flange or rib 32 provided on the radially inner edge of the base portion of the container body. It will be realized that this U-shaped flange 10c can have any desired rolling, distorting, or spinning force applied to either the radially inner or radially outer wall thereof, or to both of such walls, and to the shoulder 34 so as to obtain a desired tight compression engagement between the base plate and the plastic container body 2c and maintain such liquid tight engagement over a long service life. The plastic container body has some resiliency or cold flow properties to aid in obtaining and maintaining a good sealed connection with the metal base plate 8c. Hence improved sealing engagement can be formed between the metal base plate 8c and the container body by the shoulder 34 and the complementary shaped surfaces of the container body and metal plate. It should be noted also that the radially inner wall of the U-shaped flange 10c is of shorter vertical height than the radially outer wall to distribute the stresses exerted on the end wall 31 for sealing engagement between the base plate and the plastic container body.

Attention now is particularly directed to the details of the modified improved container means 1d of the invention as shown in FIG. 5. In this instance, a suitable plastic container body 2d is shown that has an aperture 3d formed in the base or bottom portion of the container.

The container also includes a metal support plate 8d that normally is substantially flat and defines a plane. This unit of the invention also includes a removable support or base 18d that is secured to the remainder of the container in a manner similar to that shown in the other figures of the drawings. The base 18d has an upper end contoured complementary to the lower end of the container body 2d and the peripheral portion of the support plate 8d for effective support thereof. Double walled ribs 36 and 37 extend up from and are integral with the support plate to form a channel that engages a U-shape continuous groove 35 in a thickened bottom wall 30d of the container.

A further modification of the invention in FIG. 6, illustrates a suitable plastic container body or side wall, 2e of any desired shape. The container body 2e has a bottom portion 40 which may be substantially flat and be smoothly connected to the remainder of the container body. The container body 2e has a downwardly extending, continuous end flange 41 that terminates in an aperture 3e. Again, a metal support plate 8e is provided for filling, or closing the aperture 3e and for operatively positioning a suitable heater 4e in the container for heating action. The plate 8e has a recessed center portion adjacent the heater 4e and an integral, downwardly extending continuous channel, or flange 19e that is spaced radially a short distance from the margins of the support plate 8e, as indicated in the drawings.

A cup-shaped base 18e, like the base 18b, is secured to the stud 7e of the heater 4e to draw the upper end of the base against the flat peripheral portion 80 of the support plate 8e. This construction aids in retaining the metal support plate in good sealing engagement with the container body when the nut 42 is tightened. The nut 15e is shown engaging the stud 7e to secure a cup-shaped retainer cup 43 in engagement with the lower surface of the support plate 8e to affix the electric heater thereto. The stud 7e is suitably secured to the heater 4e.

A container body 2f is shown in FIG. 7 and the container 1f is similar to the structure shown in FIG. 1. However, the flange 10f formed on a support plate 8f in this instance is positioned within the cup-like structure formed by the support plate.

Container 1g of FIG. 8 is similar to the container of FIG. 6 but a container body 2g has two downwardly extending end walls 51 and 52 formed thereon. These end walls are continuous and paralleled and are received in a double groove or flange 10g formed integrally with the metal base plate 8g.

It will be realized that the components of the container means of the invention have different rates of expansion and contraction under heating and cooling conditions. However, because of the compression engagement between the flange means on the base plate and the plastic container body, a permanent water tight, or liquid tight seal is obtained in the unit and some relative movement between these members is possible with changes in temperature of the container units.

Obviously, any known type of liquid heating coffee percolating means, vaporizing means, etc. can be provided in the container means of the invention, as desired.

The use of the thermoplastic material in the practice of the present invention is preferred as suitable, reasonably priced thermoplastic materials are available that can be molded or cast to shape economically. A further feature of the use of the thermoplastic materials in containers for water heating actions, or other similar purposes is that should the container be subjected to severe operating temperatures, for a limited length of time, the thermoplastic material where it is contacted by the flange, or groove means on the bottom plate of the container will tend to be melted or softened slightly just on its surface. Such thermoplastic materials are quite poor conductors of heat but when excessive temperatures are transmitted to the portion of the plastic container contacting the bottom or base plate in the container, such plastic by its heat resistivity will only be slightly melted or softened on its surface and if the excessive temperatures does not continue an unreasonable time, then such plastic will have only been melted slightly and will solidify to an improved sealing engagement with the metal base plate when the excessive heat supply is terminated. Hence a self-sealing action is obtained by the thermoplastic materials after the container assembly is formed therefrom.

Obviously, if desired, local indentations could be provided to aid in bonding the plastic end wall to the metal support plate, or localized rolling or shaping actions could be provided by deforming one or both walls of the continuous flange provided in the metal plate of the container assembly.

In providing improved container and electrical heater means in accordance with the principles of the invention, any suitable type of, or no control circuits may be provided for this electrical heater, as desired. Thus any known type of thermostats, fuses, and equivalent means may be used in the electrical control circuit. Such thermostats and/or fuses, or equivalent members would be positioned in good heat conductive contact with at least the metal support plates used in the containers. The thermostats used preferably are of the snap action, or of the periodic, or pulsing swing type principle. Thus, such thermostats may be designed, for example, to cut off at 185° F. after coffee has been brewed in the container, and then such thermostats would pulse "on" and "off" repetitively and would maintain a steady or holding temperature, such as about 185° F. thereafter, for the contents of the container, or by the use of heaters of known construction and usually having two separate heating coils therein, one of relatively low wattage for the heat maintenance action alone. The thermostats also function as safety devices to cut off current to the heater in the event that power is supplied to the heater in the container and the container runs dry, or is coupled to a power circuit accidentally with no liquid contents being provided in the container.

Any suitable sealing means, gaskets, and/or adhesives or cements may be used in any of the connections of metal to metal, or plastic to metal in the containers of the invention, as desired.

It also should be appreciated that the area, thickness and width of the metal plate provided in the container can vary appreciably depending upon the wattage capacity of the heater means used in the container. Any metal plate functions as a heat insulating and heat reduction barrier plate but to different degrees dependent upon the metal used. Aluminum or similar metals are acceptable where low or intermediate wattage heaters are concerned and a moderate size support plate is used; stainless steel being desirable or necessary where higher wattages, smaller plates, and smaller space factors are involved because of container bottom size limitations. Thus with higher wattage heaters, obviously more spacing and insulation should be provided between the heater and the nearest adjacent portion of the plastic container body or section in the unit. All forms of the invention provide this insulating, or heat radiating area in the metal support plate used to secure an electric heater to the plastic container body.

It should be noted that in some instances it may be practical to make the metal support plates of the invention from conventional metallic materials, such as aluminum, which do not have a low rate of heat conductivity, as does the stainless steel and equivalent materials, but which still have satisfactory heat reduction and barrier action between the center and peripheral portions thereof. Benefits from the invention can be realized from the construction of the invention even without the desirable low heat conductivity in the metal support plate. Additional, or thicker gasket means might be required to help insulate the metal support plate from the plastic container body in such instances, or the plastic container body may be made from more heat resistant material to provide a useful, desirable structure.

It also should be noted that the electric heater means used in the units of the invention may not have a support stud extending downwardly therefrom, as electric heaters have been made with a threaded base portion upon the metal enclosure for the heater at the lower end thereof, and then the electric heater, for example, could be secured to a metal support plate by a lock nut engaging the threaded lower end of the can. The can of the heater would have an annular flange thereon at the upper end of this threaded section on the can to be drawn against the upper surface of the support plate to aid in securing the can in position. The invention contemplates use of any type of electric heaters in the containers of the invention. If a downwardly extending stud is provided on the heater, it can be secured to the heater enclosure, or can in any known manner.

It will be realized that the container of the invention can be used for any desired liquid heating action, such as for brewing coffee, or for making tea, chocolate, or the like, or for vaporizing or heating liquids. The thermostats provided in the containers provide a very effective safety control means therein whereby excessive heating of the container and its contents are avoided, even though the power be supplied to the container, inadvertently, when the container is empty.

It will also be realized that any suitable type of a base may be used on the containers of the invention, and may even be omitted in some instances.

It should be realized that the insulating or isolating relationship between the electrical heater means 4 of the invention and the plastic container body is a very important feature of the present development. Thus the metal support discs or plates 8 in all instances have a continuous section, usually of substantially uniform width, that radially spaces the electric heater 4 from the adjacent portion of the plastic container body in the container unit of the invention. Such insulating or isolating distance and space may be varied appreciably in different containers dependent upon the wattage of the electric heater, the composition of the plastic used in forming the container body, etc., but normally will be many times longer in radial width than the thickness of the plate 8. These electric heater means 4 may be of the general type shown in U.S. Letters Patent Nos. 2,864,929 and 3,050,833, and may be made, for example, by the method described in the latter of such patents. The metal cans or other enclosure means used in the electrical heater means in the invention are made from any suitable metal and the heaters are of any known construction.

It should be realized that the rib, groove, channel, or flange means provided on the metal plates used to form the bases or bottoms of the containers in the units of the invention may be deformed in any desired manner and any portion of the metal plate abutting against or in juxtaposition with part of the U-shaped flange can likewise be considered to be part of the flange means and can be distorted when required to aid in obtaining the desired compressive engagement between the metal plate and the container body adjacent the aperture provided therein. Hence, in some instances, part of the L-shaped member 21, for example as shown in FIG. 1, may be deformed to aid in obtaining a sealed engagement between the metal plate and the container body. Also, when localized rolling or other pressure forces are applied to the flange or channel walls, a groove 110a may be formed in the radially outer wall of the U-shaped flange 10a of FIG. 2. Such local distortion of the outer wall of the flange provides a mechanical interlock or bond between the axially lower end of the plastic container body 2a and the flange 10a.

The construction shown in FIG. 3 also indicates that a localized rib or indentation 110b, usually continuous, may be provided in the inner wall 12b of the U-shaped flange 10b so as to form a good mechanical bond with the container and probably accompanied by some cold plastic flow of the material forming the lower end portion of the wall of the container body 2b.

Any localized indentation or protuberance can be formed on either or both of the walls of the generally U-shaped flange or channel means of the base or bottom plates of the invention to aid in obtaining a good mechanical interlock and bond between the plate container body and the metal base plate. Localized retaining grooves, or ribs 110c and 120c are shown in FIG. 4 of the drawings.

FIG. 6 of the drawings brings out that the retainer channel 19e has a localized retainer groove 119e that is formed in the radially outer wall of the U-shaped channel and which extends radially inwardly towards the adjacent wall of the channel so that a localized bonding and engaging action has been provided to improve the sealed engagement or connection between the container body and the metal base plate.

FIG. 9 of the drawings shows another type of a plastic container body, or side wall, 2h which has a downwardly extending end wall 41h terminating in a relatively large aperture 3h that occupies a major area or portion of the bottom of the plastic container body 2h. A metal base plate 8h is again provided in the container unit of the invention and it is a relatively thin metal plate or disc in relation to the thickness of the walls of the container body 2h which normally will be made from any suitable poor heat conductor plastic material to a thickness usually several times that of the plate 8h. As indicated hereinbefore, any suitable electric heater means, in this instance a heater 4h, is provided and it is secured to a substantially centrally located aperture formed in the metal plate 8h by means of a lock nut 15h that engages an upwardly extending upper end of the body portion of the electric heater 4h. Conventional heater means are located within the heater body 4h and may comprise resistance coils or wires 114h. As in other embodiments of the invention, usually the radially outer wall of a U-shaped flange, or channel 10h has a localized section indicated at 110h deformed radially inwardly for good compressive engagement between opposed wall portions of the flange 10h to obtain a good sealed bond between the container body end and the metal plate.

A suitable plastic base 18h is provided and the upper end thereof engages a radially outwardly extending flange or ledge 80h formed at the periphery of the metal plate 8h. Preferably this metal base or cup 18h is secured to the container unit by means such as a stud or cap screw 7h that may be integral with the metal enclosure, or body of the heater 4h to complete the unit of the invention. Obviously any suitable electrical control means are associated with the heater 4h and the unit of the invention and may include a thermostat 13h that has leads extending therefrom to conventional terminal prongs that are secured, for example, to a conventional terminal or mounting plate 200.

Figure 10:
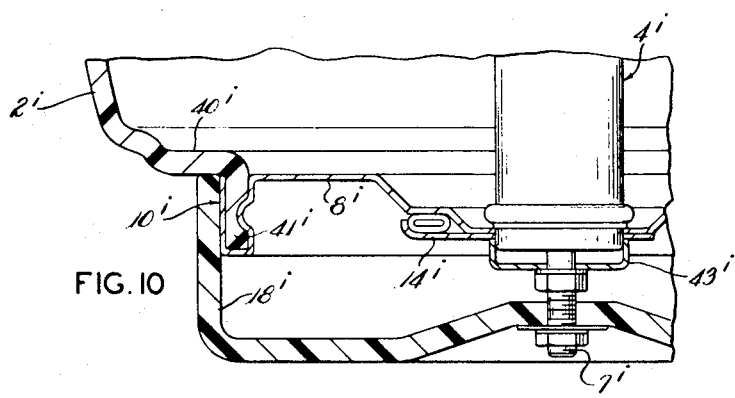
FIG. 10 is a fragmentary vertical section of a further container assembly embodying the principles of the invention.

Referring now to the modified structure shown in FIG. 10 of the drawings, it will be seen that a container body, or side wall, 2i is shown that terminates in a downwardly extending continuous end wall 41i that is formed on a bottom wall 40i of the container body. The bottom wall 40i has an aperture provided therein that normally extends over substantially the entire area of the bottom of the container body. In this instance, a metal plate 8i is provided which has a double walled channel or flange 10i formed therein and normally extending downwardly from the peripheral portion of the metal plate. The radially inner wall of this flange or channel 10i is suitably rolled, distorted, or otherwise worked, usually primarily in a localized area thereof, so as to be forced radially outwardly against the wall 41i of the container body and possibly causing some cold plastic flow of the material forming the container body, so as to aid in obtaining good compressive engagement and/or a mechanical interlock, or bond between the metal support plate 8i and the container body 2i.

A suitable cup-shaped base 18i has the upper end thereof bearing on the bottom wall 40i of the plastic container body to support the container body. This construction effectively avoids any exposure of the metal support plate 8i on the periphery of the container. Hence, only the poor heat conductive plastic material is exposed on the periphery of the container and there is no chance of a person being burned, for example, by contact with a portion of the metal support plate used in the apparatus of the invention. This base 18i is secured to the container assembly in a conventional manner, as by engaging a stud 7i that is suitably operatively secured and extends downwardly from the electric heater unit 4i. A retainer cap or strap 43i secures a thermostat positioner clip 14i against the metal plate 8i.

It should be noted that members, such as the support ledge or margin 80 of the support plate 8e, as shown in FIG. 6, have a material function in the container assembly of the invention. By the pressurized engagement between the upper end of the support or base 18e, and this metal plate 8e, an appreciable amount of heat will be transmitted from the metal plate 8e down to the base 18e under abuse conditions. The base can be made from plastic material that is an insulator but yet it will aid in preventing heat flow to the bottom portion of the container body 2e. The nut 42 or equivalent means forces the base 18e into good heat conductive engagement with the ledge 80e of the metal plate to obtain maximum heat flow therebetween.

In some instances only one of the ribs 36 and 37 might be provided in the unit of FIG. 5, and such rib then could be engaged with a complementary groove formed in the thickened bottom wall of the container. If desired, any suitable cements can be used to aid in the bond obtained between the ribs 36 and/or 37 and their receiving grooves. The unit shown in FIG. 5 is of particular value when the container body 2d, for example, would be injection molded and would have accurately sized recesses or grooves provided therein.

It will be realized that the rib or flange 10g shown in FIG. 8 can be considered a tongue that is received in a groove formed in the lower end portion of the plastic container body 2g whereby a type of tongue and groove connection, similar to that of FIG. 5, is provided between the components of the improved container assembly of the invention.

The novel unit of the invention permits, for example, a hot water heater or a coffee making device, as in FIGS. 6 or 10, to have a 500 watt heater to be safely used in a two cup, or larger container capacity unit and where the container has a base diameter of at least 4 inches. An aluminum metal plate 8i could be used in such a construction. In a similar unit, even with smaller base dimensions having a stainless steel plate 8e or 8i, for example, a higher wattage heater up to 1000 watts can be safely used.

It will be realized that in all instances, the heater means of the invention have been isolated and thermally insulated spacially and in other manners from the connection between the metal carrier or base plates of the invention and their connection with the plastic container body. The overall electrical circuit control means may include members, such as the thermostat 13h, which normally is positioned in good heat conductive relation with the metal plate supporting the heater means of the invention.

The containers of the invention can be made of any suitable size and shape by any known molding or shaping process, and the components of the base portions thereof can be assembled into the suitably prepared container body from the bottom, or top, as is preferred.

In the novel liquid heating units of the invention, the plastic container bodies have good heat insulation characteristics and preferably are shock resistant and have high resistance to the conduction of heat. The metal plate 8 and equivalents normally are thinner than the walls of the body 2 and have heat conduction characteristics many times greater than that of the plastic forming the body 2 but what may be at a low rate for metal.

It will be seen that the metal can or enclosure 5 of the heaters 4 normally is in good heat conductive contact, or relation with the metal plate 8 and that the thermostat 13 likewise is in good heat conductive association with the meal plate and/or the metal heater enclosure means.

The means securing the metal plates and the container bodies together form, in effect, tongue and groove connections as the flanges, ribs or grooves of the metal plates receive end portions or tongues of the container bodies. The depressed center area of the metal plate or disc 8e can be provided in any of the modifications of the invention. The base 18e can be made of any suitable material, preferably heat insulating plastic, and usually thermostats are positioned adjacent the metal plate 8, or equivalents. The bases or supports for the container body and metal plate or disc units are readily and securely carried in the assembly as by being secured to the heaters and usually by being supported by the metal plate at their upper end. Control means are carried by the bases for connection to power supply means.

The electric heaters used may have two separate resistance circuits therein, or a separate small "keep warm" heater may be present in the container assembly when desired.

The various rolling, turning, folding, spinning, or shaping actions disclosed for engaging a portion of the flange or channel of the metal plates with the containers can be generally referred to as metal forming action.

The terms "vertically" and "horizontally," when used in the specification and claims are used for references only, and the container is assumed to be positioned on a vertical axis for such designation of directions.

It will be obvious that the area of the continuous portion of the metal plate spacing the heater unit from the channel section of the metal plate and hence from the plastic container is not of a particular size but that such area depends upon the wattage of the heater, the material from which the plate is made, and the composition of the plastic container so as to provide the desired thermal barrier action in the metal plate.

The containers will be very attractive in design and will have a lengthy service life. Hence, it is believed that the objects of the invention have been achieved.

This is a continuation-in-part of application Serial No. 232,019, filed October 25, 1962.

While several complete embodiments of the invention have been disclosed herein, it will be appreciated that modification of these particular embodiments of the invention may be resorted to without departing from the scope of the invention as defined in the appended claims.

What is claimed is:

1. In combination in a portable electric appliance,
   a substantially rigid plastic container having a side wall terminating in a bottom aperture,
   an electric heater unit,
   a metal plate of greater size than said aperture having a continuous peripheral generally vertically extending channel section of generally U-shape cross section provided thereon, said heater unit being secured to a center portion of said metal plate in sealed engagement therewith, said channel section being radially spaced from said heater unit by a continuous intermediate portion of said metal plate,
   said metal plate being secured to said plastic container to close said aperture by a portion of said plastic container wall surrounding said aperture that is compressively secured between opposed walls of said channel section by a metal forming operation on at least one of the walls defining said channel section to seal said aperture and position said heater unit within but spacially and thermally insulated from said plastic container by said continuous portion of said metal plate, said continuous portion being of an area correlated with the wattage of said heater unit, the size of said metal plate and the material from which it is made, and the composition of said plastic container so as to prevent the transfer of excessive heat to said plastic container thereby preventing damage to said plastic container by any use thereof; said metal plate being in contact with the liquid in said container, a thermostat positioned below said metal plate and in substantially direct heat exchange relation to the lower surface of said metal plate to be primarily controlled by the temperature of said metal plate in normal operation of the appliance, circuit means connecting to said thermostat and said heater unit and being connectable to a power supply, and base means for said plastic container operatively secured thereto.

2. In combination in a portable electric appliance, a substantially rigid plastic container having a side wall terminating in a bottom aperture, an electrical heater unit, a cup-shaped metal plate of greater size than said aperture having a continuous generally vertically extending peripheral channel section of generally open U-shape cross section provided thereon, said heater unit being secured to a center portion of said metal plate in sealed engagement therewith, said channel section being radially spaced from said heater unit by a continuous intermediate portion of said metal plate, said metal plate being secured to said plastic container to close said aperture by a portion of said plastic container wall surrounding said aperture that is compressively secured between opposed walls of said channel section by a metal forming operation on at least one of the walls forming said channel section to seal said aperture and position said heater unit within but spacially and thermally insulated from said plastic container by said continuous portion of said metal plate, said continuous portion being of an area correlated with the wattage of said heater unit, the size of said metal plate and the material from which it is made, and the composition of said plastic container so as to prevent the transfer of excessive heat to said plastic container thereby preventing damage to said plastic container by any use thereof; said metal plate being in contact with the liquid in said container, a thermostat positioned below said metal plate and in operatively direct heat exchange relation to the lower surface of said metal plate to be primarily controlled by the temperature of said metal plate in normal operation of the appliance, circuit means connecting to said thermostat and said heater unit and being connectable to a power supply, and base means for said plastic container operatively secured thereto.

3. In combination in a portable electric appliance, a substantially rigid plastic container having a side wall terminating in a bottom aperture, an electrical heater unit, a metal plate of greater size than said aperture having a continuous generally vertically extending peripheral channel section of generally upwardly open U-shape cross section formed therein, said metal plate and channel section being formed from a single metal sheet and said channel section having at least a substantially uniform radial section at any portion thereof, said heater unit being secured to a center portion of said metal plate in sealed engagement therewith, said channel section being radially spaced from said heater unit by a continuous intermediate portion of said metal palte, said metal plate being adhesively secured to said plastic container to close said aperture by a portion of said plastic container wall being received between opposed walls of said channel section to seal said aperture and position said heater unit within but spacially and thermally insulated from said plastic container by said continuous portion of said metal plate, said continuous portion being of an area correlated with the wattage of said heater unit, the size of said metal plate and the material from which it is made, and the composition of said plastic container so as to prevent the transfer of excessive heat to said plastic container thereby preventing damage to said plastic container by any use thereof; said metal plate being in contact with the liquid in said container, a thermostat positioned below said metal plate and in operatively direct heat exchange relation to said metal plate to be primarily controlled by the temperature of said metal plate in normal operation of the appliance, circuit means connecting to said thermostat and said heater unit and being connectable to a power supply, and base means for said plastic container operatively secured thereto.

4. In combination in a portable electric appliance, a substantially rigid plastic container having a side wall terminating in a bottom aperture, an electrical heater unit, a metal plate of greater size than said aperture having a continuous generally vertically extending, upwardly open, peripheral channel section formed therein, said metal plate and channel section being formed from a single metal sheet and said channel section having an at least substantially uniform radial section at any portion thereof, said heater unit being operatively carried by a center portion of said metal plate in sealed relation therewith, said channel section being radially spaced from said heater unit by a continuous intermediate portion of said metal plate, said metal plate being secured to said plastic container to close said aperture by a portion of said plastic container wall surrounding said aperture that is compressively secured between opposed walls of said channel section to seal said aperture and position said heater unit within but spacially and thermally insulated from said plastic container by said continuous portion of said metal plate, said continuous portion being of an area correlated with the wattage of said heater unit, the size of said metal plate and the material from which it is made, and the composition of said plastic container so as to prevent the transfer of excessive heat to said plastic container thereby preventing damage to said plastic container by any use thereof; said metal plate being in contact with the liquid in said container, a thermostat positioned below said metal plate and in operatively direct heat exchange relation to said metal plate to be controlled at least in part by the temperature of said metal plate in normal operation of the appliance, circuit means connecting to said thermostat and said heater unit and being connectable to a power supply, and base means for said plastic container operatively secured thereto.

5. In combination in a portable electric appliance, a substantially rigid plastic container having a side wall with a bottom aperture, an electrical heater unit, a plate of greater size than said aperture having a continuous integral generally vertically extending, upwardly open peripheral channel section of generally U-shape cross section provided thereon, said heater unit being secured to a center portion of said metal plate in sealed engagement therewith, said channel section being radially spaced from said heater unit by a continuous portion of said metal plate, said metal plate having a substantially horizontally extending radially outer edge, said metal plate being secured to said plastic container to close said aperture by a portion of said plastic container wall surrounding said aperture that is received between opposed walls of said channel section and sealed in engagement therewith to close said aperture and position said heater unit within but spacially and thermally insulated from said plastic container by said continuous portion of said metal plate, said continuous portion being of an area correlated with the wattage of said heater unit, the size of said metal plate and the material from which it is made, and the composition of said plastic container so as to prevent the transfer of excessive heat to said plastic container thereby preventing damage to said plastic container by any use thereof; said metal plate being in contact with the liquid in said container, a thermostat positioned below at least a portion of said metal plate and in heat exchange relation with said metal plate.

circuit means connecting to said thermostat and said heater unit and being connectable to a power supply, upwardly open cup-shaped base means for said plastic container, and means operatively securing said base means to said plastic container with the upper edge of said base means engaging said metal plate outer edge to support said plastic container without creating separation forces on the connection of said metal plate to said container.

6. In combination in a portable electric appliance, a substantially rigid plastic container having a side wall terminating in a bottom aperture, an electrical heater unit, a metal plate of greater size than said aperture having a continuous upwardly extending peripheral channel section of generally open U-shape cross section provided thereon, said heater unit being secured to a center portion of said metal plate in sealed engagement therewith, said channel section being radially spaced from said heater unit by a continuous intermediate portion of said metal plate, said metal plate being secured to said plastic container to close said aperture by a portion of said plastic container wall surrounding said aperture that is compressively secured between opposed walls of said channel section by at least one of said walls defining said channel section being locally deformed towards the other of said walls by a metal forming operation to seal said aperture and position said heater unit within but spacially and thermally insulated from said plastic container by said continuous portion of said metal plate, said continuous portion being of an area correlated with the wattage of said heater unit, the size of said metal plate and the material from which it is made, and the composition of said plastic container so as to prevent the transfer of excessive heat to said plastic container thereby preventing damage to said plastic container by any use thereof; said metal plate being in contact with the liquid in said container, a thermostat positioned below said metal plate and in operatively direct heat exchange relation to said metal plate to be primarily controlled by the temperature of said metal plate in normal operation of the appliance, circuit means connecting to said thermostat and said heater unit and being connectable to a power supply, and base means for said plastic container operatively secured thereto.

7. In combination in an electric liquid heating appliance, a substantially rigid plastic container having a side wall terminating in a bottom aperture, an electrical heater unit, a metal plate of greater size than said aperture having a continuous upwardly extending peripheral channel section of generally open U-shape cross section formed therein, said metal plate and channel section being formed from a single metal sheet, said heater unit being secured to a center portion of said metal plate in sealed engagement therewith, said channel section being radially spaced from said heater unit by a continuous intermediate portion of said metal plate, said metal plate being secured to said plastic container to close said aperture by a portion of which said container wall surrounding said aperture that is compressively secured between opposed walls of said channel section by a metal forming operation on at least one of the walls defining said channel section to seal said aperture and position said heater unit within but spacially and thermally insulated from said plastic container by said continuous portion of said metal plate, said continuous portion being of an area correlated with the wattage of said heater unit, the size of said metal plate and the material from which it is made, and the composition of said plastic container so as to prevent the transfer of excessive heat to said plastic container thereby preventing damage to said plastic container by any use thereof; said metal plate being in contact with the liquid in said container and being made from a metal having a low rate of heat conductivity, a thermostat positioned below said metal plate and in operatively direct heat exchange relation to said metal plate to be primarily controlled by the temperature of said metal plate in normal operation of the appliance, circuit means connecting to said thermostat and said heater unit and being connectable to a power supply, and base means for said plastic container operatively secured thereto.

8. In combination in a portable electric appliance, a substantially rigid thermoplastic plastic container having a side wall terminating in a bottom aperture defined by a vertically extending portion of said plastic container, an electrical heater unit, a metal plate of greater size than said aperture having a continuous peripheral generally vertically extending channel section of generally U-shape cross section provided thereon, said heater unit being secured to a center portion of said metal plate in sealed relation thereto, said channel section being radially spaced from said heater unit by a continuous intermediate portion of said metal plate, said metal plate being secured to said plastic container to close said aperture by said portion of said plastic contanier wall surrounding said aperture that is compressively secured between opposed walls of said channel section by a metal forming operation on at least one of the walls defining said channel section to seal said aperture and position said heater unit within but spacially and thermally insulated from said plastic container by said continous portion of said metal plate, said continuous portion being of an area correlated with the wattage of said heater unit, the size of said metal plate and the material from which it is made, and the composition of said plastic container so as to prevent the transfer of excessive heat to said plastic container thereby preventing damage to said plastic container by any use thereof; any part of said portion of said plastic container that may be softened by excessive or abnormal heat flow thereto from said metal plate being confined by said channel section and resolidifying in situ when heat flow thereto terminates; said metal plate being in contact with the liquid in said container, a thermostat positioned below said metal plate and in operatively direct heat exchange relation to said metal plate to be primarily controlled by the temperature of said metal plate in normal operation of the appliance, circuit means connecting to said thermostat and said heater unit and being connectable to a power supply, and base means for said plastic container operatively secured thereto.

9. In combination in a portable electric appliance, a substantially rigid plastic container having a side wall terminating in a bottom aperture extending completely across the inside of said plastic container at the bottom thereof, an electrical heater unit having a downwardly extending member thereon, a metal plate of greater size than said aperture having a continuous peripheral generally vertically extending channel section of generally U-shape in section formed therein, said heater unit being secured to a center portion of said metal plate in sealed relation thereto but with said support member extending downwardly from said metal plate, said channel section being radially spaced from said heater unit by a continuous intermediate portion of said metal plate, said metal plate being secured to said plastic container to close said aperture by a portion of said plastic container wall surrounding said aperture that is compressively secured between opposed walls of said channel section by a metal forming operation on at least one of the walls forming said channel section to seal said aperture and position said heater unit within but spacially and thermally insulated from said plastic container by said continuous portion of said metal plate, said continuous portion being of an area correlated with the wattage of said heater unit, the size of said metal plate and the material from which it is made, and the composition of said plastic container so as to prevent the transfer of excessive heat to said plastic container thereby preventing damage to said plastic container by any use thereof; said metal plate being in contact with the liquid in said container, a thermostat positioned below said metal plate and in operatively direct heat exchange relation to said metal plate to be primarily controlled by the temperature of said metal plate in normal operation of the appliance, circuit means connecting to said thermostat and said heater unit and being connectable to a power supply, base means for said plastic container, and means engaging said support member and said base means to secure said base means to said plastic container.

10. In combination in a portable electric appliance, a plastic container having a bottom with an aperture therein, an electrical heater means, a metal plate of greater size than said aperture, interconnected vertically extending tongue and groove means formed on a peripheral portion of said metal plate and on said container bottom adjacent said aperture for providing a sealed connection therebetween to form a liquid receiving chamber, said tongue and groove means comprising togue means on one of said container and said metal plate and groove means on the other of said container and said metal plate, said heater means being operatively associated with a central portion of said metal plate in sealed relation therewith, said tongue and groove means being radially spaced from said heater means by a continuous portion of said metal plate, said heater means being positioned within but spacially and thermally insulated from said plastic container by said continuous portion of said metal plate, said continuous portion being of an area correlated with the wattage of said heater means, the size of said metal plate and the material from which it is made, and the composition of said plastic container so as to prevent the transfer of excessive heat to said plastic container thereby preventing damage to said plastic container by any use thereof; said metal plate being in contact with the liquid in said container, a thermostat positioned adjacent said metal plate and heater means in operatively direct heat exchange relation thereto to be primarily controlled by the temperatures thereof, circuit means connecting to said thermostat and said heater means and being connectable to a power source, and base means for said plastic container operatively secured thereto.

11. In combination in a portable electric appliance, a plastic container having a bottom portion having an aperture extending over a substantial area thereof and having continuous groove means in a lower face of said bottom portion, an electrical heater unit, a metal plate of greater size than said aperture having continuous peripheral vertically upwardly extending tongue means formed therein, said heater unit being operatively secured to a center portion of said metal plate, said tongue means being radially spaced from said heater unit by a continuous intermediate portion of said metal plate, said metal plate being secured to said plastic container by said tongue means being engaged in said groove means, said heater means being positioned within but spacially and thermally insulated from said plastic container by said continuous portion of said metal plate, said continuous portion being of an area correlated with the wattage of said heater means, the size of said metal plate and the material from which it is made, and the composition of said plastic container so as to prevent the transfer of excessive heat to said plastic container thereby preventing damage to said plastic container by any use thereof; said metal plate being in contact with the liquid in said container, a thermostat positioned adjacent said metal plate and heater means in operatively direct heat exchange relation thereto to be primarily controlled by the temperatures thereof, circuit means connecting to said thermostat and said heater means and being connectable to a power source, and base means for said plastic container operatively secured thereto.

12. In combination in a portable electric appliance, a substantially rigid plastic container having a side wall terminating at its lower end in a horizontally extending portion and a generally vertically extending section having a bottom aperture therein, an electrical heater unit, a metal plate of greater size than said aperture having a continuous peripheral generally vertically extending channel section of generally U-shape in section provided thereon, said heater unit being carried by a center portion of said metal plate in sealed relation thereto, said channel section being radially spaced from said heater unit by a continuous intermediate portion of said metal plate, said metal plate being secured to said plastic container to close said aperture by said vertically extending section of said plastic container being compressively secured between opposed walls of said channel section by a metal forming operation on at least one of the walls forming said channel section to seal said aperture and position said heater unit within but spacially and thermally insulated from said plastic container by said continuous portion of said metal plate, said continuous portion being of an area correlated with the wattage of said heater unit, the size of said metal plate and the material from which it is made, and the composition of said plastic container so as to prevent the transfer of excessive heat to said plastic container thereby preventing damage to said plastic container by any use thereof; said metal plate being in contact with the liquid in said container, a thermostat positioned below said metal plate and in operatively direct heat exchange relation to said metal plate to be controlled at least in part by the temperature of said metal plate in normal operation of the appliance.

circuit means connecting to said thermostat and said heater unit and being connectable to a power supply, and base means for said plastic container operatively secured thereto.

13. In combination in a portable electric appliance, a substantially rigid plastic container having a side wall terminating in a bottom aperture, an electrical heater means, a metal plate of greater size than said aperture having a continuous peripheral generally vertically extending upwardly open channel section of generally U-shape in section provided thereon, said heater means being operatively carried by a center portion of said metal plate, said channel section being radially spaced from said heater means by a continuous intermediate portion of said metal plate, said metal plate being secured to said plastic container to close said aperture by a portion of said plastic container wall surrounding said aperture that is compressively secured between opposed walls of said channel section by a metal forming operation on at least one of the walls forming said channel section to seal said aperture and position said heater means within but spacially and thermally insulated from said plastic container by said continuous portion of said metal plate, said continuous portion being of an area correlated with the wattage of said heater means, the size of said metal plate and the material from which it is made, and the composition of said plastic container so as to prevent the transfer of excessive heat to said plastic container thereby preventing damage to said plastic container by any use thereof; said metal plate being in contact with the liquid in said container, a thermostat positioned adjacent said metal plate and heater means in operatively direct heat exchange relation thereto to be primarily controlled by the temperatures thereof, circuit means connecting to said thermostat and said heater means and being connectable to a power supply, and base means for said plastic container operatively secured thereto.

References Cited in the file of this patent

UNITED STATES PATENTS

| 2,526,566 | Kolisch | Oct. 17, 1950 |
| 2,753,088 | Prahl | July 3, 1956 |
| 2,929,908 | Parker et al. | Mar. 22, 1960 |

FOREIGN PATENTS

| 719,962 | Great Britain | Dec. 8, 1954 |
| 728,676 | Great Britain | Apr. 27, 1955 |
| 864,363 | Great Britain | Apr. 6, 1961 |

UNITED STATES PATENT OFFICE
CERTIFICATE OF CORRECTION

Patent No. 3,138,698

June 23, 1964

Alton R. Wells et al.

It is hereby certified that error appears in the above numbered patent requiring correction and that the said Letters Patent should read as corrected below.

Column 3, line 17, for "plane" read -- plate --; column 8, line 9, for "plate" read -- plastic --; column 10, line 9, for "meal" read -- metal --; column 12, line 2, for "palte" read -- plate --; column 14, line 67, for "contanier" read -- container --; column 15, line 27, before "member" insert -- support --; column 16, line 2, for "togue" read -- tongue --.

Signed and sealed this 5th day of January 1965.

(SEAL)
Attest:

ERNEST W. SWIDER
Attesting Officer

EDWARD J. BRENNER
Commissioner of Patents